United States Patent [19]

Burghardt et al.

[11] Patent Number: 4,597,586
[45] Date of Patent: Jul. 1, 1986

[54] PYROTECHNIC TENSIONER FOR VEHICLE SAFETY BELT

[75] Inventors: Wilfried Burghardt, Altomuenster; Karl E. Nilsson, Ottobrunn; Hans-Hellmut Ernst, Sulfeld, all of Fed. Rep. of Germany

[73] Assignee: Britax-Kolb GmbH & Co., Dachau, Fed. Rep. of Germany

[21] Appl. No.: 658,538

[22] Filed: Oct. 9, 1984

[30] Foreign Application Priority Data

Oct. 7, 1983 [GB] United Kingdom ............... 8326889

[51] Int. Cl.$^4$ ............................................. B60R 21/10
[52] U.S. Cl. ................................................ 280/806
[58] Field of Search ............... 280/805, 806; 60/632, 60/635; 227/9, 10

[56] References Cited

U.S. PATENT DOCUMENTS

| | | | |
|---|---|---|---|
| 4,385,775 | 5/1983 | Shimogana et al. | 280/806 |
| 4,458,921 | 7/1984 | Chiba et al. | 280/806 |
| 4,508,287 | 4/1985 | Nilsson | 280/806 |
| 4,508,288 | 4/1985 | Nilsson | 280/806 |

Primary Examiner—Richard A. Bertsch
Attorney, Agent, or Firm—Hayes, Davis & Soloway

[57] ABSTRACT

Apparatus for tensioning a strap of a vehicle safety belt system, comprises a cylindrical drum, a first roller journaled on a stationary axis parallel to that of the drum and spaced radially outwardly from the surface thereof, a second roller mounted with its axis parallel to the axis of the drum at a radius between that of the surface of the drum and the first roller, and pyrotechnically powered means for causing angular movement of the second roller about the axis of the drum. Guide means are located at a greater radial distance from the axis of the drum than the second roller and oriented so that, prior to detonation of the pyrotechnic charge, the angular position of the second roller about the axis of the drum is between the first roller and the additional guide means. The strap passes between the second roller and the surface of the drum but radially outwardly of the first roller. Prior to detonation of the pyrotechnic charge, the strap does not touch the surface of the drum. When the charge is detonated, the second roller draws in the strap, wrapping it round the surface of the drum.

8 Claims, 9 Drawing Figures

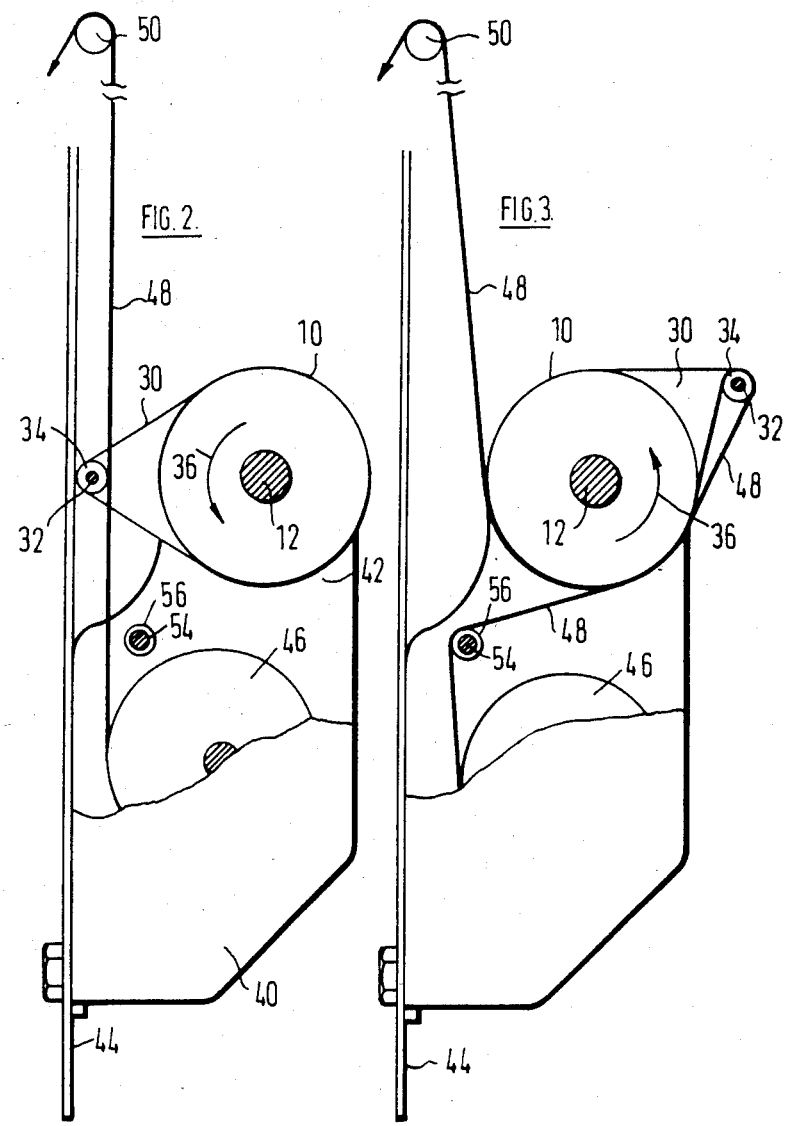

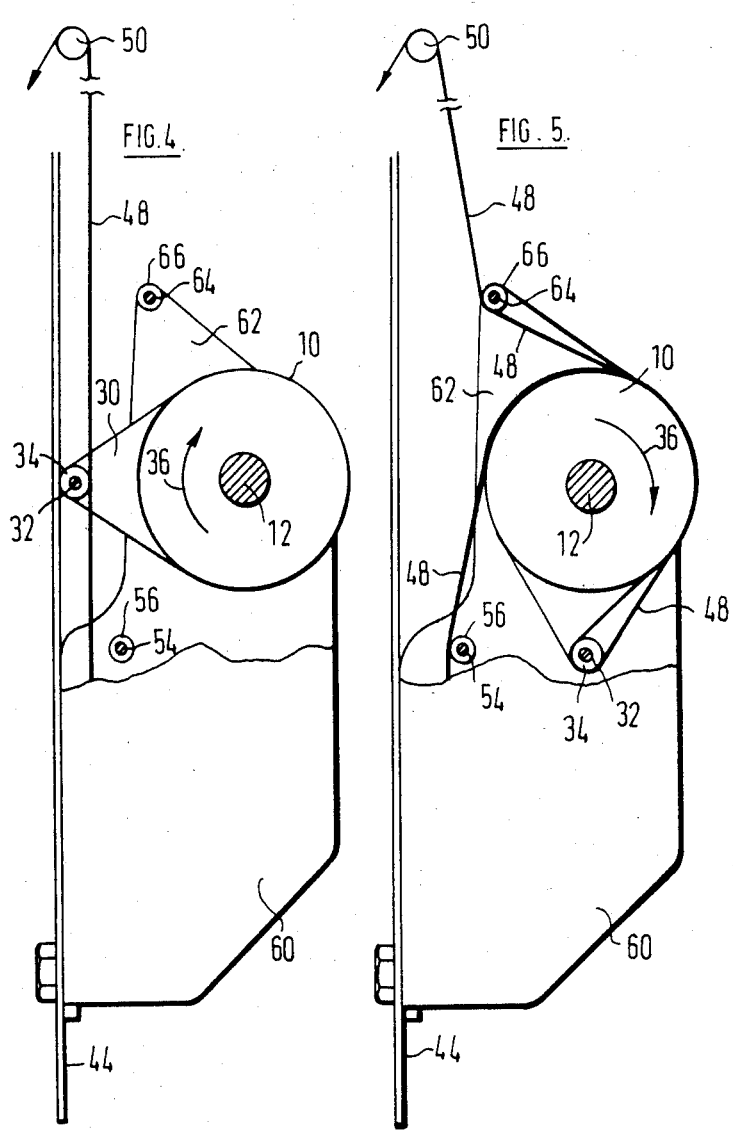

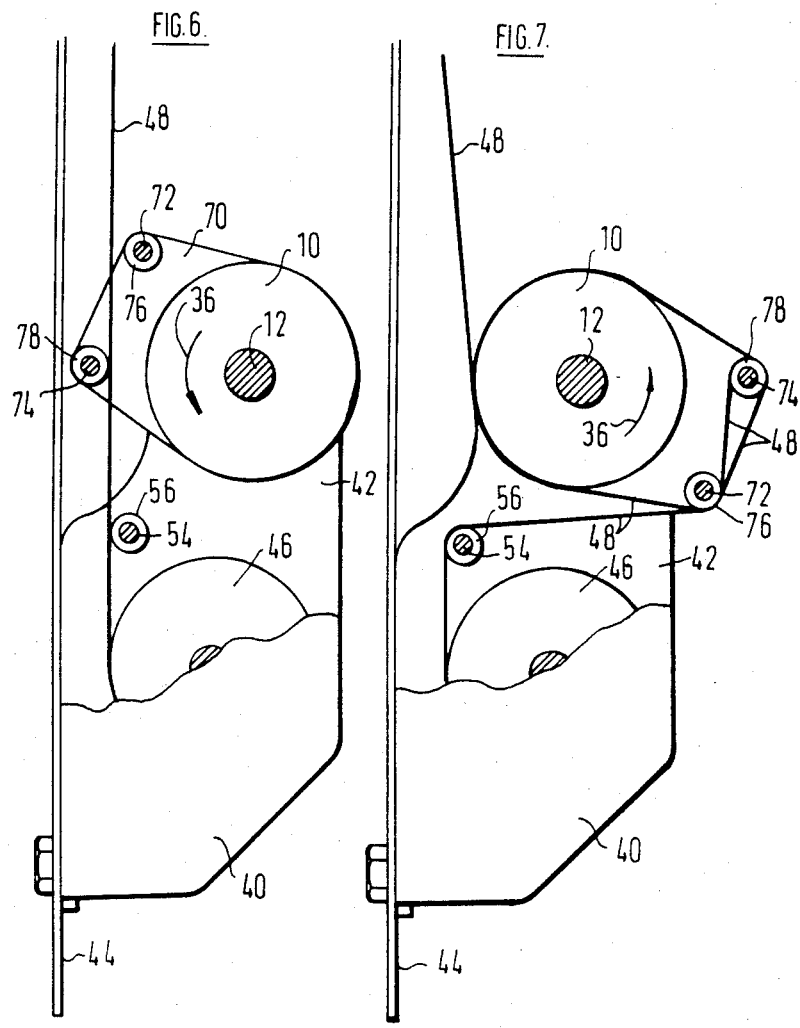

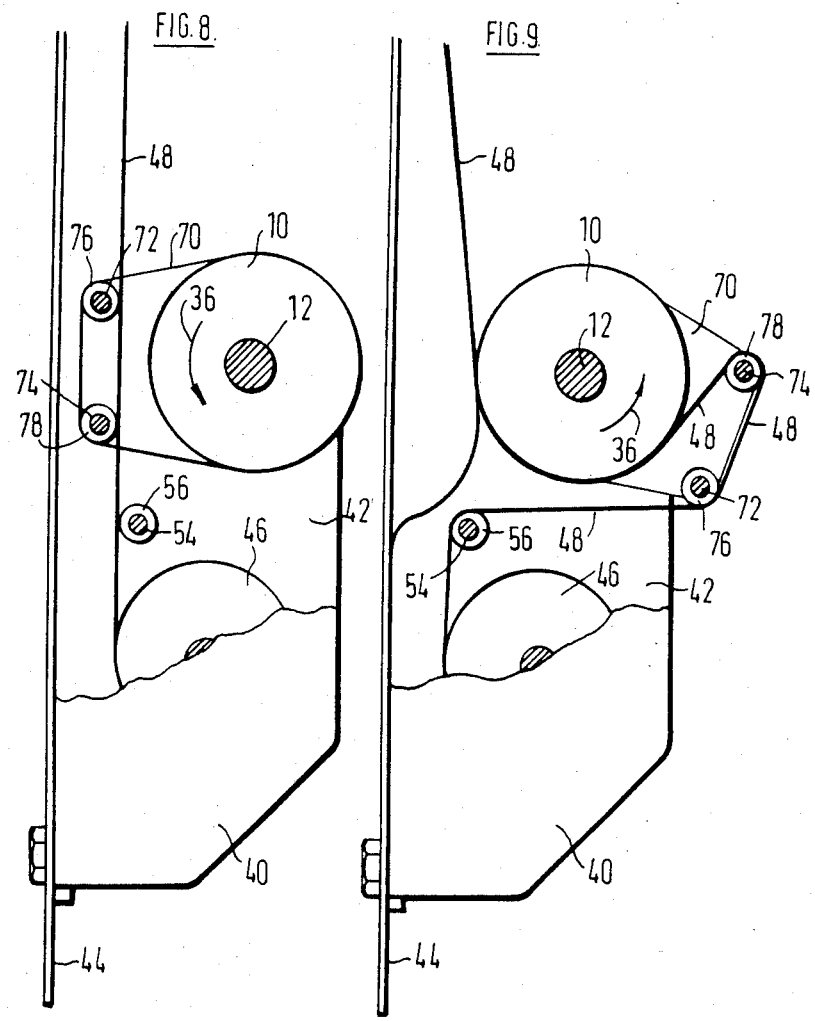

PYROTECHNIC TENSIONER FOR VEHICLE SAFETY BELT

This invention relates to apparatus for tensioning a strap of a vehicle safety belt system, of the type comprising a cylindrical drum, a first roller journaled on a stationary axis parallel to that of the drum and spaced radially outwardly from the surface thereof, a second roller mounted with its axis parallel to the axis of the drum at a radius between that of the surface of the drum and the first roller, and pyrotechnically powered means for causing angular movement of the second roller about the axis of the drum. In use, the safety belt strap is arranged to pass between the second roller and the surface of the drum but radially outwardly of the first roller, the apparatus being oriented relative to the path of such strap so that, prior to detonation of the pyrotechnically powered means, the strap is subject to minimum deflection by the two rollers. When the charge is detonated, the second roller draws in the strap, wrapping it round the surface of the drum.

Apparatus of this type is disclosed in Patent Specification No. FR-A-2430241. A conventional retractor for the safety belt is disposed inside the drum, a strap of the safety belt emerging through a slot therein. With this arrangement, two layers of the strap are in engagement with one another around the surface of the drum very soon after angular movement of the second roller has commenced, the two layers tending to move in opposite directions. A substantial portion of the energy derived from the pyrotechnic charge is therefore dissipated in overcoming the friction of these two oppositely moving layers.

According to the invention, apparatus for tensioning the strap of a vehicle safety belt system, of the type described above, is provided with additional guide means located at a greater radial distance from the axis of the drum than the second roller and oriented so that, prior to detonation of the pyrotechnic charge, the angular position of the second roller about the axis of the drum is between the first roller and the additional guide means and the strap does not touch the surface of the drum as it follows the shortest path from the additional guide means, between the second roller and the drum to the first roller.

In one form of the invention, where the tensioning apparatus and associated retractor are mounted near the bottom of the B-post of a motor car, the guide means may be constituted by a so-called "pillar loop" mounted on such B-post adjacent to the shoulder of the user. Alternatively, the additional guide means may take the form of a further static roller mounted on the tensioning apparatus on the opposite side of the drum to that where the retractor is mounted.

According to a further alternative, an additional movable roller may be mounted at a location spaced from the second roller for simultaneous angular movement therewith under the effect of the pyrotechnically powered means.

It is preferable for the surface of the drum to rotate with the second roller so as to minimise relative movement between the strap and the surface of the drum, thereby further reducing friction.

Embodiments of the invention will now be described, by way of example, with reference to the accompanying drawings, in which:

FIG. 2 is a partially broken-away schematic side view of a first embodiment of the invention prior to detonation of the pyrotechnic charge;

FIG. 3 is a partially broken-away schematic side view of the embodiment shown in FIG. 1 after detonation of the pyrotechnic charge;

FIGS. 4 and 5 are views, corresponding to FIGS. 2 and 3, of a second embodiment of the invention;

Figure 1:
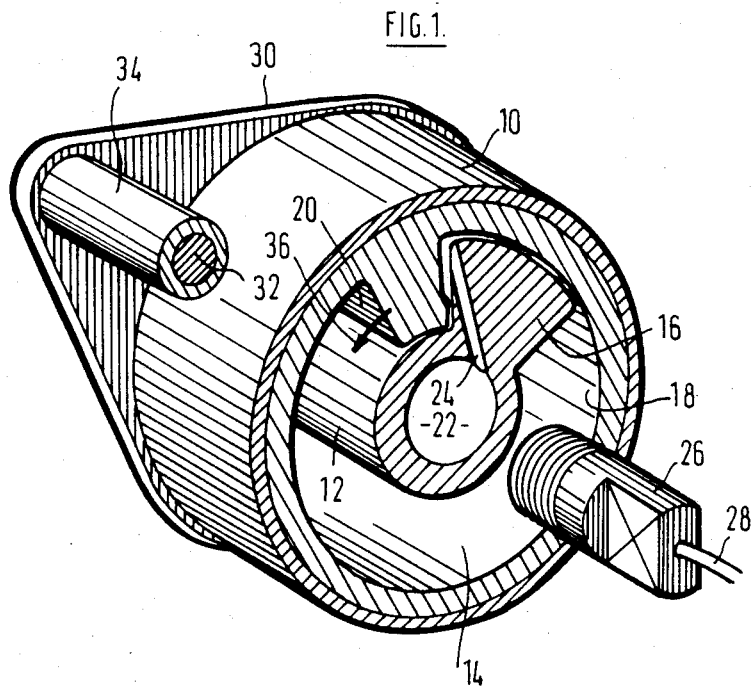
FIG. 1 is a perspective view of a known pyrotechnic tensioning device which can be embodied in tensioning apparatus in accordance with the invention.

FIGS. 6 and 7 are views, corresponding to FIGS. 2 and 3, of a third embodiment of the invention; and FIGS. 8 and 9 are views, corresponding to FIGS. 2 and 3, of a fourth embodiment of the invention.

Referring first to FIG. 1, a drum 10 is journaled on a shaft 12 by means of substantially gas-tight bearings (not shown) at each end, an annular chamber 14 being formed between these two gas-tight bearings. The shaft 12 carries a vane 16 which projects into substantially gas-tight engagement with the outer wall 18 of the chamber 14 which is formed by the cylindrical inner surface of the drum 10. Similarly the drum 10 has an inwardly projecting vane 20 which extends into gas-tight engagement with the cylindrical surface of the shaft 12. A combustion chamber 22 is provided within the shaft 12 and has a duct 24 leading therefrom to one side wall of the vane 16. A pyrotechnic charge 26, from which extends a detonation cable 28, is screwed into one end of the chamber 22.

Mounted on each end of the drum 10' for angular movement therewith, is a respective end plate 30, only one of which can be seen in FIG. 1. A shaft 32, carrying a roller 34, extends between the two end plates 30 at a greater radius from the shaft 12 than the outer surface of the drum 10.

In use, the drum is initially disposed with its vane 20 closely adjacent to the side of the vane 16 through which the duct 24 emerges. When the pyrotechnic charge 26 is detonated, the gases produce thereby expand through the duct 24 driving the vane 20 in the direction indicated by the arrow 36, thus causing angular movement of the drum 10 and the roller 34 in a counter-clockwise direction as viewed in FIG. 1. It will be appreciated that, apart from the charge 26, the various components illustrated in FIG. 1 are symmetrical about the plane on which the cross-section is taken.

Turning now to FIG. 2, the shaft 12 of the unit illustrated in FIG. 1 is mounted between two side plates 40 and 42, the front side plate 40 being shown broken away for convenience of illustration. The side plates 40 and 42 form part of a frame which is mounted on the inner side of the inner member 44 of the B-post of a motor vehicle. In other words, the assembly is accommodated with the B-post.

Also mounted between the side plates 40 and 42 is a conventional emergency locking retractor shown schematically at 46. A strap 48 of the safety belt system extends from the retractor 46 between the drum 10 and the roller 34 to a piller loop 50 which is also mounted on the B-post 44. As can be seen from FIG. 2, even when the strap 48 is fully retracted by the retractor 46, it only just touches the roller 34 in the course of its path to the piller loop 50. Another roller 56, journaled on a shaft 54 which is mounted on the side plates 40 and 42 between the drum 10 and the retractor 46, is positioned so that the strap 48 would only lightly tough it when a sufficient length of the strap 48 is withdrawn from the retractor 46 to enable the safety belt system to be used.

When the pyrotechic charge is detonated, the drum 10 and the roller 34 move in a counter-clockwise direction to the position shown in FIG. 3. Assuming that the retractor 46 has already locked, the strap 48 is drawn back over the pillar loop 50. Since the drum 10 is moving in the same direction as the roller 34, there is relative little slip between the strap 48 and the surface of the drum 10. The portion of the strap 48 between the rollers 34 and 54 does not tough the portion of the strap 48 between the roller 34 and the pillar loop 50 until the roller 34 is above the level of the bottom of the drum 10. Consequently it is only at this stage that any significant proportion of the energy from the charge is dissipated in overcoming friction.

FIGS. 4 and 5 illustrate a second embodiment which differs from the embodiment illustrated in FIGS. 2 and 3 in two respects. Firstly, the interior of the drum 10 is modified so that the pyrotechnic charge rotates it in the clockwise direction instead of the counter-clockwise direction. Secondly, the side plates 40 and 42 of FIG. 2 are replaced by side plates 60 and 62 which extend above the top of the drum 10 to provide support for a shaft 64 on which an additional guide roller 66 is journaled. Other components are identical with the corresponding components of FIG. 2 and are denoted by the same reference numerals.

The configuration of the strap 48 prior to detonation of the pyrotechnic charge, as shown in FIG. 4, is basically the same as its configuration in the embodiment shown in FIG. 2. However, when the charge is detonated, moving the drum 10 and the roller 34 in the clockwise direction, drawing the strap 48 round the drum 10 as illustrated in FIG. 5. The portion of the strap 48 which is in contact with the surface of the drum is now the portion which extends from the roller 34 to the roller 56 and thence to the retractor 46 (not shown in FIGS. 4 and 5). Consequently, this portion of the strap 48, which remains stationary from the time when the retractor locks, has to slip over the moving surface of the drum 10, thus somewhat increasing the friction during the initial stage of angular movement. However, the portion of the strap 48 extending from the roller 34 to the pillar loop 50 is now the outside of the double layer on the drum 10, rather than being trapped under the other portion as was the case in FIG. 3, thus decreasing the friction during later stages of operation.

FIGS. 6 and 7 illustrate a third embodiment which differs from that illustrated in FIGS. 2 and 3 only in that the side plates 30 on the drum 10 are replaced by side plates 70 carrying two spaced shafts 72 and 74 each of which has a respective roller 76 and 78 journaled thereon. The side plates 70 are so oriented relative to the vane 20 (FIG. 1) that, in the pre-detonated condition, the strap 48 passes outside the roller 76 but between the roller 78 and the drum 10 as illustrated in FIG. 6. When the charge is detonated, the drum 10 and the rollers 74 and 76 move in the counter-clockwise direction. There is no strap-to-strap contact at all until the roller 78 is above the roller 76 and, even then, webbing contact is confined to a small area round the roller 76 until the latter is above the bottom of the drum 10 (i.e. beyond the position illustrated in FIG. 7).

FIGS. 8 and 9 illustrate a fourth embodiment of the invention which differs from the embodiment illustrated in FIGS. 6 and 7 only in that the side plates 70 are set at a different angle to the vane 20 (FIG. 1) so that, in the pre-detonated state, the strap 48 passes between both rollers 76 and 78 on the one hand and the drum 10 on the other, as illustrated in FIG. 8.

When the charge is detonated, the drum 10 and rollers 76 and 78 move counter-clockwise towards the position illustrated in FIG. 9. With this embodiment, there is no strap-to-strap contact until the roller 76 is above the bottom of the drum, i.e. after the position illustrated in FIG. 9.

The choice of the particular embodiment of the invention which is most suitable for a particular application will depend on the characteristics required. In general, maximum tensioning will be obtained if friction is minimised. On the other hand, some friction may be desirable when the safety belt system is subject to maximum loading during an accident in order to reduce the load on the locking mechanism of the retractor 46.

The embodiment illustrated in FIGS. 8 and 9 may be modified by replacing the rollers 56 and 76 by fixed bars, the former preferably having a high-friction surface. In addition, the roller 78 is constructed so as to bend under loads of the magnitude encountered during accident conditions so that its central region engages with a stop (not shown) mounted on the side plates 70 between the roller 78 and the fixed bar which replaces the roller 76. This stop serves both to inhibit rotation of the roller 78 and to support some of the load imposed thereon. The result is to increase the friction to which the strap 48 is subject as the drum 10 moves to the position illustrated in FIG. 9.

We claim:

1. Apparatus for tensioning a strap of a vehicle safety belt system comprising a cylindrical drum, a first roller journaled on a stationary axis parallel to that of the drum and spaced radially outwardly from the surface thereof, a second roller mounted with its axis parallel to the axis of the drum at a radius between that of the surface of the drum and the first roller, means powered by a pyrotechnic charge for causing angular movement of the second roller about the axis of the drum, and additional guide means located at a greater radial distance from the axis of the drum than the second roller and oriented so that, prior to detonation of the pyrotechnic charge, the angular position of the second roller about the axis of the drum is between the first roller and the additional guide means and the strap does not touch the surface of the drum as it follows the shortest path from the additional guide means, between the second roller and the drum to the first roller, and so that detonation of the pyrotechnic charge causes the second roller to pass between the first roller and the surface of the drum thereby lengthening the path of the strap between the first roller and the additional guide means.

2. Apparatus according to claim 1, wherein the surface of the drum is arranged to rotate simultaneously with the second roller.

3. Apparatus according to claim 2, wherein the additional guide means is mounted on the body of a motor vehicle adjacent to the shoulder of the user.

4. Apparatus according to claim 2, wherein the additional guide means includes a further static roller mounted on the tensioning apparatus on the side of the drun to that where the retractor is mounted.

5. Apparatus according to claim 2, wherein an additional movable roller is mounted at a location spaced from the second roller for simultaneous angular movement therewith.

6. Apparatus according to claim 1, wherein the additional guide means is mounted on the body of motor vehicle adjacent to the shoulder of the user.

7. Apparatus according to claim 1, wherein the additional guide means includes a further static roller mounted on the tensioning apparatus on the side of the drum to that where the retractor is mounted.

8. Apparatus according to claim 1, wherein an additional movable roller is mounted at a location spaced from the second roller for simultaneous angular movement therewith.

* * * * *